US011118901B2

(12) United States Patent
Matsumoto

(10) Patent No.: US 11,118,901 B2
(45) Date of Patent: Sep. 14, 2021

(54) IMAGE PROCESSING SYSTEM AND IMAGE PROCESSING METHOD

(71) Applicant: OMRON Corporation, Kyoto (JP)

(72) Inventor: Shinya Matsumoto, Osaka (JP)

(73) Assignee: OMRON Corporation, Kyoto (JP)

( * ) Notice: Subject to any disclaimer, the term of this patent is extended or adjusted under 35 U.S.C. 154(b) by 206 days.

(21) Appl. No.: 16/133,171

(22) Filed: Sep. 17, 2018

(65) Prior Publication Data

US 2019/0170506 A1 Jun. 6, 2019

(30) Foreign Application Priority Data

Dec. 1, 2017 (JP) .............................. JP2017-232027

(51) Int. Cl.
*G01B 11/25* (2006.01)
*G06T 1/00* (2006.01)
(Continued)

(52) U.S. Cl.
CPC .......... *G01B 11/25* (2013.01); *G02B 27/0955* (2013.01); *G02B 27/283* (2013.01);
(Continued)

(58) Field of Classification Search
CPC .......... G06T 7/521; G06T 2207/10152; G06T 7/586; G06T 1/0007; G01B 11/25;
(Continued)

(56) References Cited

U.S. PATENT DOCUMENTS 6,549,288 B1 * 4/2003 Migdal .................. G01B 11/25
356/601
9,591,240 B1 * 3/2017 Barbu ..................... G06T 5/003
(Continued)

FOREIGN PATENT DOCUMENTS

DE 102008002730 * 12/2009
DE 102008002730 A1 12/2009
(Continued)

OTHER PUBLICATIONS

The extended European search report dated Mar. 15, 2019 in a counterpart European patent application.
(Continued)

*Primary Examiner* — Shaghayegh Azima
(74) *Attorney, Agent, or Firm* — Metrolex IP Law Group, PLLC

(57) ABSTRACT

An image processing system includes a first light projection unit that projects, onto an object, a light pattern for specifying a three-dimensional shape; a second light projection unit that projects, onto the object, substantially uniform light, in which illumination energy is substantially uniform in a cross-sectional direction relative to a light projection direction, at substantially the same angle as in projection performed by the first light projection unit; an image capturing unit that captures images of the object; a generation unit that generates a division image by dividing components of a first captured image, which is captured while light is projected onto the object by the first light projection unit, by components of a second captured image, which is captured while light is projected onto the object by the second light projection unit; and a calculation unit that calculates three-dimensional positions on the object with use of the division image.

19 Claims, 8 Drawing Sheets

(51) Int. Cl.

| | |
|---|---|
| *G06T 7/521* | (2017.01) |
| *G06T 7/586* | (2017.01) |
| *G02B 27/09* | (2006.01) |
| *G02B 27/28* | (2006.01) |
| *G03B 21/60* | (2014.01) |
| *H04N 5/232* | (2006.01) |
| *H04N 5/235* | (2006.01) |

(52) U.S. Cl.
CPC ............ *G03B 21/60* (2013.01); *G06T 1/0007* (2013.01); *G06T 7/521* (2017.01); *G06T 7/586* (2017.01); *H04N 5/232* (2013.01); *H04N 5/2353* (2013.01); *G06T 2207/10152* (2013.01)

(58) Field of Classification Search
CPC .... H04N 5/2353; H04N 5/232; G02B 27/283; G03B 21/60
See application file for complete search history.

(56) References Cited

U.S. PATENT DOCUMENTS

| | | | |
|---|---|---|---|
| 10,194,129 B2* | 1/2019 | Chang | H04N 13/254 |
| 2008/0106746 A1 | 5/2008 | Shpunt et al. | |
| 2008/0118143 A1* | 5/2008 | Gordon | G06T 7/521 |
| | | | 382/154 |
| 2008/0240502 A1 | 10/2008 | Freedman et al. | |
| 2009/0066929 A1* | 3/2009 | Tropf | G01B 11/2513 |
| | | | 356/3.12 |
| 2009/0096783 A1 | 4/2009 | Shpunt et al. | |
| 2010/0074532 A1* | 3/2010 | Gordon | G06T 7/536 |
| | | | 382/203 |
| 2010/0177164 A1 | 7/2010 | Zalevsky et al. | |
| 2011/0158508 A1 | 6/2011 | Shpunt et al. | |
| 2012/0281240 A1 | 11/2012 | Cohen et al. | |
| 2013/0136305 A1 | 5/2013 | Shpunt et al. | |
| 2013/0155195 A1 | 6/2013 | Zalevsky et al. | |
| 2014/0037296 A1* | 2/2014 | Yamada | H04B 10/116 |
| | | | 398/128 |
| 2015/0116582 A1 | 4/2015 | Yoshikawa et al. | |
| 2015/0287205 A1 | 10/2015 | Zalevsky et al. | |
| 2016/0050401 A1* | 2/2016 | Gordon | G01B 11/2513 |
| | | | 348/744 |
| 2016/0253821 A1* | 9/2016 | Romano | G06K 9/00355 |
| | | | 382/103 |
| 2016/0364872 A1* | 12/2016 | Nakajima | G01B 11/25 |
| 2017/0004623 A1 | 1/2017 | Zalevsky et al. | |
| 2017/0076458 A1* | 3/2017 | Caulier | G02B 7/36 |
| 2017/0237955 A1* | 8/2017 | Koyama | G06F 3/0418 |
| | | | 348/745 |
| 2017/0287923 A1 | 10/2017 | Zalevsky et al. | |
| 2018/0020146 A1 | 1/2018 | Yoshikawa et al. | |
| 2018/0232047 A1* | 8/2018 | Yoon | G06T 7/80 |
| 2018/0260967 A1* | 9/2018 | Bleyer | H04N 5/2252 |
| 2018/0359424 A1* | 12/2018 | Shibusawa | H04N 5/2353 |

FOREIGN PATENT DOCUMENTS

| | | |
|---|---|---|
| JP | H03-289505 A | 12/1991 |
| JP | 2002-213931 A | 7/2002 |
| JP | 2005-140537 A | 6/2005 |
| JP | 2008-249432 A | 10/2008 |
| JP | 2009-511897 A | 3/2009 |
| JP | 2012-68176 A | 4/2012 |
| JP | 2015-87243 A | 5/2015 |
| JP | 2017-138176 A | 8/2017 |
| JP | 2017-191082 A | 10/2017 |
| JP | 2017191082 | * 10/2017 |

OTHER PUBLICATIONS

Office Action (JPOA) dated Feb. 2, 2021 in a counterpart Japanese patent application.
Office Action (JPOA) dated May 7, 2021 in a counterpart Japanese patent application.

* cited by examiner

IMAGE PROCESSING SYSTEM AND IMAGE PROCESSING METHOD

CROSS-REFERENCES TO RELATED APPLICATIONS

This application claims priority to Japanese Patent Application No. 2017-232027 filed Dec. 1, 2017, the entire contents of which are incorporated herein by reference.

FIELD

The disclosure relates to an image processing system and an image processing method.

BACKGROUND

In recent years, consideration has been given to systems for generating a three-dimensional map of an object by projecting light in a coded pattern or a random dot pattern onto the object, capturing an image of the object when the light is projected thereon, and then analyzing the obtained image (e.g., see JP 2009-511897A and US 2008/0240502).

JP 2009-511897A and US 2008/0240502 are examples of related art.

In this technology, if protrusions and recessions are present in the surface of the object for which a three-dimensional map is to be generated, the irradiation light will be reflected irregularly, and therefore reflected light will not be obtained favorably. Similarly, if light penetrates into or is scattered by the surface of the object for example, favorable reflected light will likewise not be obtained. In the case of such a subject for which favorable reflected light is not obtained, if a three-dimensional map is generated simply with use of a captured image of the object as in the techniques disclosed in JP 2009-511897A and US 2008/0240502, data will be missing, for example, for regions where sufficient reflected light is not obtained, and it is not possible to generate an appropriate three-dimensional map.

SUMMARY

Several aspects have been achieved in light of the foregoing problems, and may provide an image processing system and an image processing method that enable favorably generating 3D point group information regarding an object.

An image processing system according to an aspect includes: a first light projection unit configured to project, onto an object, a light pattern for specifying a three-dimensional shape; a second light projection unit configured to project, onto the object, substantially uniform light in which illumination energy is substantially uniform in a cross-sectional direction relative to a light projection direction, the second light projection unit projecting the substantially uniform light at substantially the same angle as in projection performed by the first light projection unit; a first light projection control unit configured to control projection of the light pattern onto the object by the first light projection unit; a second light projection control unit configured to control projection of the substantially uniform light onto the object by the second light projection unit; an image capturing unit configured to capture an image of the object; an image capturing control unit configured to control image capturing performed by the image capturing unit; a first captured image recording unit configured to record a first captured image that is captured by the image capturing unit in a state where the first light projection control unit performs control such that the light pattern is projected and the second light projection control unit performs control such that the substantially uniform light is not projected; a second captured image recording unit configured to record a second captured image that is captured by the image capturing unit in a state where the first light projection control unit performs control such that the light pattern is not projected and the second light projection control unit performs control such that the substantially uniform light is projected; a generation unit configured to generate a division image by dividing components of the first captured image by components of the second captured image; and a calculation unit configured to calculate a three-dimensional position on the object with use of the division image.

According to this configuration, the first captured image is captured by performing image capturing while the light pattern is projected onto the object, and the second captured image is captured by performing image capturing while the substantially uniform projection light is projected onto the object. By projecting the light pattern and the substantially uniform light onto the object at substantially the same angle, it is possible to cause the reflection characteristics at the object surface to approximate each other. As a result, by dividing components of the first captured image by components of the second captured image, it is possible to reduce the influence of a coefficient component that corresponds to the reflectance of the object surface in the division image, thus making it possible to favorably calculate 3D point group information regarding the object.

Note that here, the components of the first captured image can include luminance values of the first captured image, or the results of performing a linear transformation (multiplication by a predetermined coefficient, and/or addition/subtraction of a predetermined value) on the luminance values of the first captured image. The same follows for the components of the second captured image as well.

In the above configuration, a configuration is possible in which the generation unit is configured to generate the division image by obtaining a first image by subtracting components of a third captured image from components of the first captured image, the third captured image being captured in a state where ambient light is projected onto the object and the first light projection unit and the second light projection unit are not performing projection, obtaining a second image by subtracting components of the third captured image from components of the second captured image, and then dividing the first image by the second image.

According to this configuration, the third captured image is captured while only ambient light is projected, and the third captured image is subtracted from both the first captured image and the second captured image. This therefore makes it possible to reduce the influence of ambient light in both the first captured image and the second captured image. By obtaining the division image from images in which the influence of ambient light is reduced, and then calculating three-dimensional positions with use of this division image, it is possible to favorably calculate 3D point group information regarding the object.

Note that here, the components of the third captured image can include luminance values of the third captured image, or the results of performing a linear transformation (multiplication by a predetermined coefficient, and/or addition/subtraction of a predetermined value) on the luminance values of the third captured image. The same follows for the components of the image that is obtained by subtracting the components of the third captured image from the components of the first captured image, and for the components of the image that is obtained by subtracting the components of the third captured image from the components of the second captured image.

In the above configuration, a configuration is possible in which a projection time of the second light projection unit when capturing the second captured image is shorter than a projection time of the first light projection unit when capturing the first captured image.

According to this configuration, the luminance values of the first captured image and the luminance values of the second captured image can be brought closer to each other. Accordingly, by suppressing the occurrence of halation in the captured images, it is possible to favorably calculate 3D point group information regarding the object.

In the above configuration, a configuration is possible in which an exposure time of the image capturing unit when capturing the second captured image is shorter than an exposure time of the image capturing unit when capturing the first captured image.

According to this configuration, the luminance values of the first captured image and the luminance values of the second captured image can be brought closer to each other. Accordingly, by suppressing the occurrence of halation in the captured images, it is possible to favorably calculate 3D point group information regarding the object.

In the above configuration, a configuration is possible in which the first light projection unit and the second light projection unit are configured to perform projection with use of the same projection lens.

According to this configuration, the light pattern and the substantially uniform light can be projected along the same axis. As a result, it is possible to cause the characteristics of the coefficient component corresponding to reflectance of the object surface to approximate each other in the first captured image and the second captured image, thus making it possible to favorably reduce the coefficient component in the division image.

In the above configuration, a configuration is possible in which the first light projection unit and the second light projection unit are configured to perform projection with use of the same light source.

According to this configuration, it is possible to realize the same wavelength characteristics for the light pattern and the substantially uniform light that are projected. As a result, it is possible to cause the characteristics of the coefficient component corresponding to reflectance of the object surface to approximate each other in the first captured image and the second captured image, thus making it possible to favorably reduce the coefficient component in the division image.

In the above configuration, a configuration is possible in which the first light projection unit is configured to perform projection with use of a first light source, and the second light projection unit is configured to project the substantially uniform light onto the object at substantially the same angle as the first light projection unit with use of a second light source provided separately from the first light source.

According to this configuration, it is possible to eliminate the need for a part such as a part for splitting the light emitted from a light source (e.g., a beam splitter) in order to project the light pattern and project the substantially uniform light.

In the above configuration, a configuration is possible in which the first light projection unit is configured to perform projection with use of a first light source and a first projection lens, and the second light projection unit is configured to project the substantially uniform light onto the object at substantially the same angle as in projection performed by the first light projection unit, with use of a second light source and a second projection lens that are provided separately from the first light source and the first projection lens.

According to this configuration, it is possible to eliminate the need for parts such as parts for splitting and multiplexing light emitted from a light source (e.g., a beam splitter and a polarization beam splitter) in order to project the light pattern and project the substantially uniform light.

In the above configuration, a configuration is possible in which an intensity of the first light source is higher than an intensity of the second light source.

According to this configuration, the luminance values of the first captured image and the luminance values of the second captured image can be brought closer to each other. Accordingly, by suppressing the occurrence of halation in the captured images, it is possible to favorably calculate 3D point group information regarding the object.

In the above configuration, a configuration is possible in which the image processing system further includes: a reading unit that is configured to read three-dimensional structure data regarding the object; and a matching unit that is configured to perform matching between the three-dimensional structure data regarding the object and the three-dimensional position.

According to this configuration, it is possible to eliminate the need for parts such as parts for splitting and multiplexing light emitted from a light source (e.g., a beam splitter and a polarization beam splitter) in order to project the light pattern and project the substantially uniform light.

An image processing method according to an aspect is a method in which an image processing system performs: a first light projection step of projecting, onto an object, a light pattern for specifying a three-dimensional shape; a second light projection step of projecting, onto the object, substantially uniform light, in which illumination energy is substantially uniform in a cross-sectional direction relative to a light projection direction, at substantially the same angle as in projection performed in the first light projection step; an image capturing step of capturing an image of the object; a generating step of generating a division image by dividing components of a first captured image, which is captured while light is projected onto the object in the first light projection step, by components of a second captured image, which is captured while light is projected onto the object in the second light projection step; and a calculating step of calculating a three-dimensional position on the object with use of the division image.

According to this configuration, the third captured image is captured while only ambient light is projected, and the third captured image is subtracted from both the first captured image and the second captured image. This therefore makes it possible to reduce the influence of ambient light in both the first captured image and the second captured image. By obtaining the division image from images in which the influence of ambient light is reduced, and then calculating three-dimensional positions with use of this division image, it is possible to favorably calculate 3D point group information regarding the object.

Note that in the disclosure, "unit", "means", "device", and "system" do not simply signify a physical means, and also encompass cases in which the functions of the "unit", "means", "device", or "system" are realized by software. Also, the functions of one "unit", "means", "device", or "system" may be realized by two or more physical means or devices, and the functions of two or more "units", "means", "devices", or "systems" may be realized by one physical means or device.

DETAILED DESCRIPTION

Figure 1:
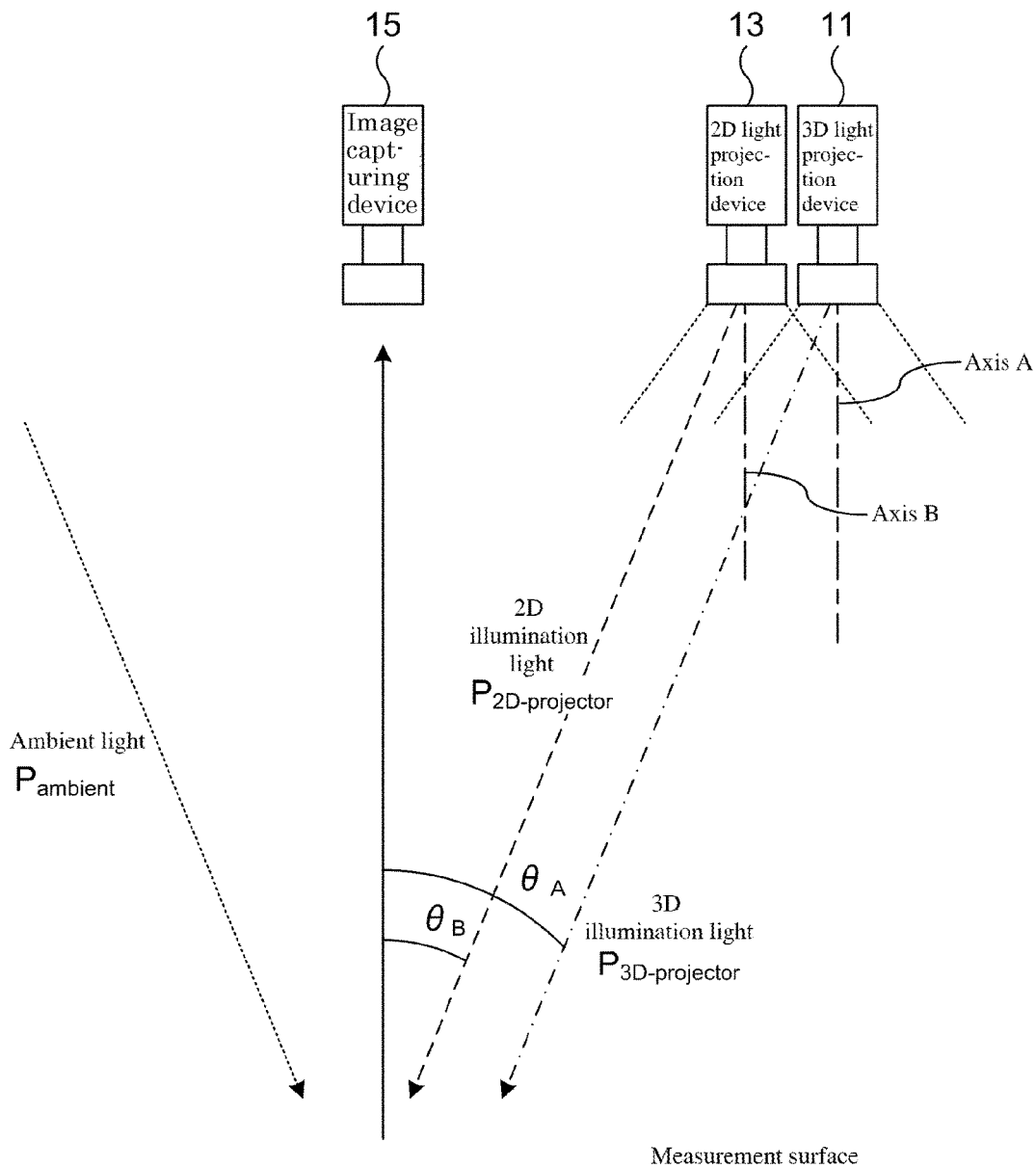
FIG. 1 is a diagram illustrating applicability of an image processing system according to an embodiment.

The following describes embodiments with reference to the drawings. Note that embodiments described below are merely illustrative, and are not intended to exclude any modifications and technical applications that are not explicitly described below. In other words, the present invention can be carried out with various modifications without departing from the spirit of the invention. Also, in the drawings referenced below, identical or similar elements are denoted by identical or similar reference signs. The drawings are schematic, and the illustrations therein do not necessarily coincide with the actual dimensions, ratios, and the like. Also, the dimensional relationships and ratios of portions may differ between drawings.

1. Application Example 1.1 Overview

First, an example of operations of an image processing system according to an embodiment will be described with reference to FIG. 1. FIG. 1 is a diagram for illustrating an operation principle of the image processing system according to an embodiment.

As a technique for performing three-dimensional measurement of an object, there is a technique that is based on the principle of triangulation and projects a fixed pattern of light onto an object. There are two main types of such a technique, namely a temporal technique in which multiple patterns of projection light are prepared and temporally switched at high speed when performing light projection, and also a spatial technique in which a single spatially-coded light pattern is projected. The spatial technique is employed in the image processing system of an embodiment. In this spatial technique, the three-dimensional shape of an object is acquired by a procedure in which a light pattern coded with a complex pattern is projected onto an object, an image capturing device captures a pattern image of the object onto which the light pattern is projected, and distance calculation is performed based on the pattern image.

One conceivable specific example of the spatial technique is a method in which, in order to perform three-dimensional measurement with use of light projected on an object, a light projection device, which projects a predetermined light pattern, and an image capturing device are provided in a parallel arrangement, and rectification is performed between the light pattern that was projected by the light projection device and the captured image that was captured by the image capturing device (hereinafter, also called a "3D image"). With this technique, a corresponding row in the image that was used in light pattern projection and in the 3D image is specified by obtaining corresponding pixels in the image that was used in light pattern projection and in the 3D image. The three-dimensional coordinates on the object at which the processing target pixel was projected are then specified based on a plane specified by the corresponding row and an epipolar line specified by a line segment between the corresponding pixels. Performing this processing on all of the pixels makes it possible to obtain three-dimensional coordinates for each point on the object.

In this way, in three-dimensional measurement performed using a spatial pattern projection technique, the three-dimensional coordinates of positions on an object that has a three-dimensional shape are specified by projecting a complex pattern onto the object and capturing an image of the pattern with an image capturing device (camera). However, if the object has a complex three-dimensional shape, or has a complex texture, there are cases where it is not possible to specify with sufficient precision the pattern that is to be specified in the captured image captured by the image capturing device. For example, in the case where the object is an industrial product that has not been subjected to surface polishing or has scratches and depressions, an accurate pattern cannot be read due to the pattern being distorted by the protrusions and recessions in the shape, thus making it difficult to specify a three-dimensional point group. A similar problem can occur also in the case where light penetrates into or is scattered by the surface of the object, for example. This problem becomes more prominent the closer the light projection device and the image capturing device are located to the object.

As shown in FIG. 1, the image processing system of an embodiment has a function for projecting a complex pattern (hereinafter, also called "3D illumination light") onto an object (measurement surface) with a 3D light projection device 11, and a function for projecting substantially uniform light not having a pattern (hereinafter, also called "2D illumination light") onto the object with a 2D light projection device 13. Note that in FIG. 1, the 3D light projection device 11 and the 2D light projection device 13 are shown as different devices, but there is no limitation to this, and a configuration is possible in which the 3D illumination light and the 2D illumination light can both be projected from a single light projection device. Specific examples of the configurations of the light projection devices will be described later with reference to FIGS. 4 to 7. Here, the 3D light projection device 11 and the 2D light projection device 13 are respectively examples of a "first light projection unit" and a "second light projection unit" of an embodiment.

Here, the 3D illumination light and the 2D illumination light are projected at substantially the same angle relative to the object surface ($\theta_A \approx \theta_B$), such that the 3D illumination light and the 2D illumination light are both reflected with substantially the same reflectance at each position on the object surface. For this reason, it is preferable that a central axis A of the light projected by the 3D light projection device 11 and the central axis B of the light projected by the 2D light projection device 13 are the same, or if not the same, are close to each other and substantially parallel. In the former case, the 3D light projection device 11 and the 2D light projection device 13 may be provided as a single integrated device, for example. In the latter case, the 3D light projection device 11 and the 2D light projection device 13 may be arranged parallel with each other and adjacent to each other, for example.

The image capturing device 15 captures a 3D image obtained during light projection performed by the 3D light projection device 11, and a 2D image obtained during light projection performed by the 2D light projection device 13. By dividing the 3D image by the 2D image, the image processing system can reduce the influence of a coefficient component that corresponds to the reflectance at the object (measurement surface), and obtain a favorable pattern image. Here, the image capturing device 15 is an example of an "image capturing unit" of an embodiment, and the 3D image and the 2D image are respectively examples of a "first captured image" and a "second captured image" of an embodiment.

Also, in the case where the influence of ambient light is particularly large, a configuration is possible in which the image capturing device 15 additionally captures an ambient light image in a state where only ambient light, and not the 3D illumination light and the 2D illumination light, is projected onto the object. In this case, by subtracting the ambient light image from both the 3D image and the 2D image and then performing division, it is possible to remove the ambient light component and the component corresponding to the reflectance of the object surface. Note that the ambient light image is an example of a "third captured image" of an embodiment.

1.2 Principle

The following describes principles of an embodiment with reference to FIG. 1. Here, $P_{2D\text{-}projector}$ and $P_{3D\text{-}projector}$ respectively represent the energies of the 2D illumination light and the 3D illumination light respectively, and $P_{ambient}$ represents the energy of the ambient light. Also, α represents a coefficient component that is dependent on the reflectance of light projected onto the object surface, and is a luminance value conversion coefficient for converting the energies of the 2D illumination light and the 3D illumination light into energies of light received by an image sensor. Likewise, β represents a coefficient component that is dependent on the reflectance of the object surface, and is a luminance value conversion coefficient for converting the energy of ambient light, which is natural light and light from exterior lighting, into energy of light received by an image sensor. Note that here, it is assumed that the α components produced by the 2D illumination light and the 3D illumination light are deemed to be substantially the same due to the fact that the 3D illumination light and the 2D illumination light are projected onto the object surface at substantially the same angle ($\theta_A \approx \theta_B$).

At this time, the following expression obtains a luminance value $I_{3D}(x,y)$ for a pixel (x,y) of the image capturing device 15 when receiving light from the object illuminated by the 3D illumination light (i.e., the luminance value for the pixel (x,y) of the 3D image).

$$I_{3D}(x,y) = \alpha \cdot P_{3D\text{-}projector}(x,y) + \beta \cdot P_{ambient}(x,y) \qquad \text{Expression 1}$$

Similarly, the following expression obtains a luminance value $I_{2D}(x,y)$ for a pixel (x,y) of the image capturing device 15 when receiving light from the object illuminated by the 2D illumination light, which is substantially uniform light (i.e., the luminance value for the pixel (x,y) of the 2D image).

$$I_{2D}(x,y) = \alpha \cdot P_{2D\text{-}projector} + \beta \cdot P_{ambient}(x,y) \qquad \text{Expression 2}$$

Also, the following expression obtains a luminance value $I_{ambient}(x,y)$ for a pixel (x,y) of the image capturing device 15 when receiving light from the object illuminated by only the ambient light and not by the 2D illumination light and the 3D illumination light (i.e., the luminance value for the pixel (x,y) of the ambient light image).

$$I_{ambient}(x,y) = \beta \cdot P_{ambient}(x,y) \qquad \text{Expression 3}$$

In other words, by subtracting the luminance value $I_{ambient}(x,y)$ of the ambient light image from both the luminance value $I_{3D}(x,y)$ of the 3D image and the luminance value $I_{2D}(x,y)$ of the 2D image, it is possible to remove the influence of ambient light. Accordingly, the following expression represents a luminance value $I_p(x,y)$ of a division image that is obtained by the luminance value $I_{3D}(x,y)$ of the 3D image being divided by the luminance value $I_{2D}(x,y)$ of the 2D image after removing the influence of ambient light from both of them.

$$I_p(x,y) = \frac{I_{3D}(x,y) - I_{ambient}(x,y)}{I_{2D}(x,y) - I_{ambient}(x,y)} = \frac{\alpha \cdot P_{3D\text{-}projector}(x,y)}{\alpha \cdot P_{2D\text{-}projector}} = \frac{P_{3D\text{-}projector}(x,y)}{P_{2D\text{-}projector}} \qquad \text{Expression 4}$$

In other words, it is possible to remove the α component, which is dependent on the reflectance of the light projected onto the object, in the division image. The energy $P_{2D\text{-}projector}$ of the 2D illumination light, which is substantially uniform light, is substantially constant regardless of position, and therefore the luminance value $I_p(x,y)$ of the division image can be simplified by the following expression. In the following expression, γ is a constant.

$$I_p(x,y) = \gamma \cdot P_{3D\text{-}projector}(x,y) \qquad \text{Expression 5}$$

Accordingly, by using the division image, it is possible to identify a pattern for performing three-dimensional measurement in a state of having removed the α component that corresponds to the reflectance of the object and the ambient light component $P_{ambient}$. In other words, it is possible to suppress the influence of protrusions and recessions or scratches in the object surface, light scattering, light penetration, and the like, and it is possible to favorably acquire the three-dimensional shape of the object.

Note that in the case where ambient light can be substantially ignored ($P_{ambient} \approx 0$), such as the case where the object is in a dark environment, the second term in Expressions 1 and 2 can be ignored, and therefore it is possible to omit the subtraction of the ambient light image, and to simply use the division image obtained by dividing the luminance values of the 3D image by the luminance values of the 2D image.

Note that as previously mentioned, the influence of the reflectance of the object surface increases the closer the 3D light projection device 11 and the image capturing device 15 are to the object, and the influence of the reflectance of the object surface can be reduced by identifying a pattern with use of the division image in this manner. In other words, in comparison with the case of not using the division image, it is possible to more favorably acquire the three-dimensional shape even when the distance is close.

Here, if light projection and image capturing are performed at a close distance, the amount of light received by the image sensor of the image capturing device 15 is generally high, and halation is likely to occur in the captured image. Generally, if it is assumed that light sources having approximately the same intensity are used for the 3D illumination light and the 2D illumination light (including the case where the light sources are exactly the same), the 2D image captured with substantially uniform light has higher luminance values than the 3D image captured with a light pattern. Accordingly, it is conceivable to bring the luminance values of the 3D image and the 2D image closer to each other by setting a shorter illumination time for the 2D illumination light in 2D image capturing than the illumination time for the 3D illumination light in 3D image capturing, or by setting a shorter exposure time for the image sensor of the image capturing device 15 in 2D image capturing than the exposure time for the image sensor of the image capturing device 15 in 3D image capturing. Alternatively, in the case of using different illumination sources for the 3D illumination light and the 2D illumination light, it is conceivable to set a weaker intensity for the light source for 2D illumination light than the intensity of the light source for 3D illumination light.

2. Example of Operation Configuration

Figure 2:
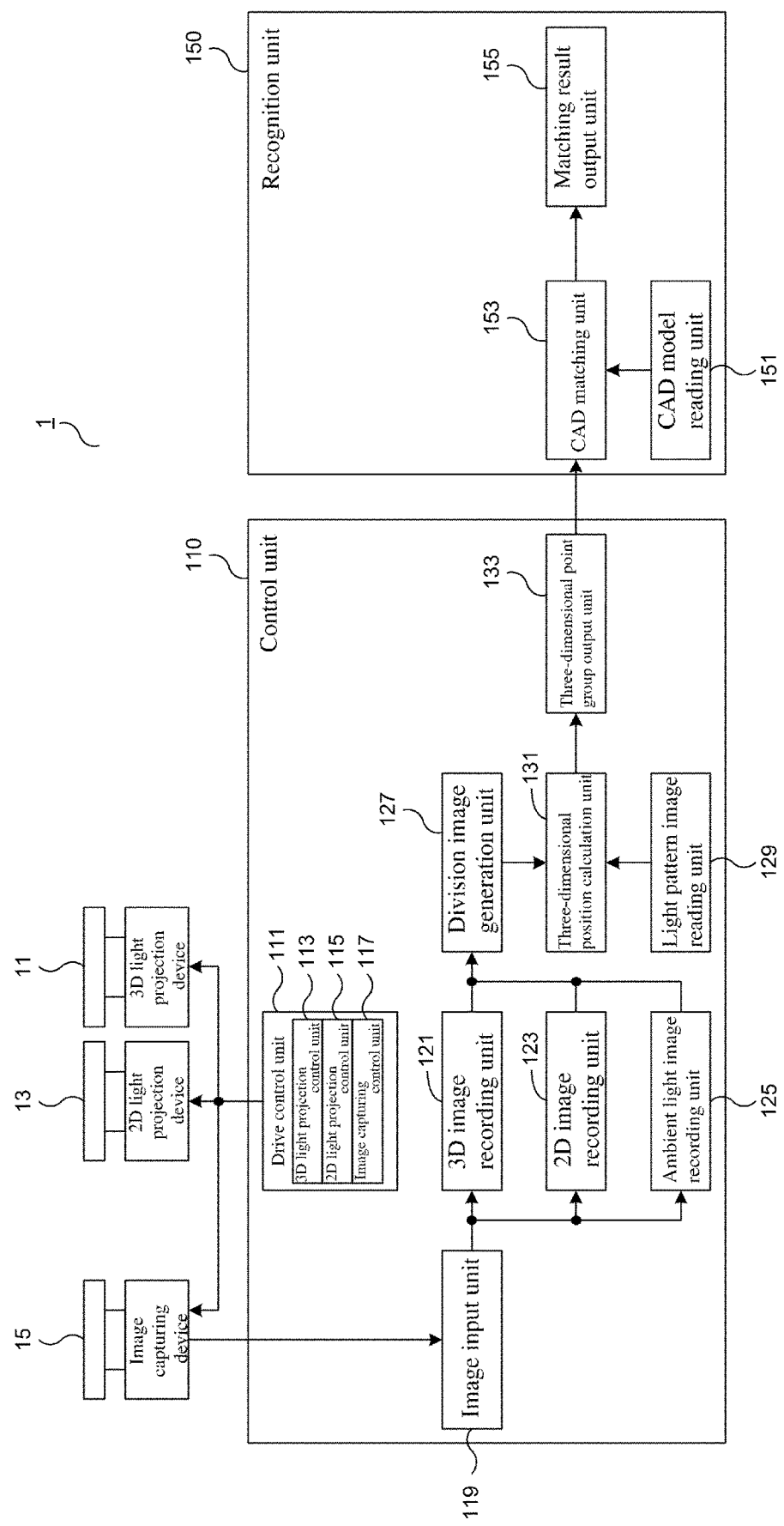
FIG. 2 is a diagram schematically illustrating an example of a configuration of an image processing system according to an embodiment.

The following describes an example of a configuration for operation of an image processing system 1 of an embodiment with reference to FIG. 2. The image processing system 1 mainly includes the 3D light projection device 11, the 2D light projection device 13, the image capturing device 15, a control unit 110, and a recognition unit 150. Note that the configurations of the control unit 110 and the recognition unit 150 may be realized as programs that run on a processor, or may be realized as dedicated hardware such as a semiconductor.

2.1 3D Light Projection Device 11, 2D Light Projection Device 13, and Image Capturing Device 15

The 3D light projection device 11 projects 3D illumination light having a complex pattern onto the object under control of a 3D light projection control unit 113 included in a drive control unit 111 of the control unit 110. The 2D light projection device 13 projects onto the object substantially uniform light, in which the irradiation energy is substantially the same at each position on a plane perpendicular to the central axis B (cross-sectional direction relative to the light projection direction), that is to say light not having a pattern, under control of a 2D light projection control unit 115 likewise included in the drive control unit 111. At this time, the projection time of the 3D illumination light projected by the 3D light projection device 11 may be set longer than the projection time of the 2D illumination light projected by the 2D light projection device 13, or the intensity of the light source of the 3D light projection device 11 may be set higher than the intensity of the light source of the 2D light projection device 13. Accordingly, the luminance values of the 3D image and the 2D image captured by the image capturing device 15 can be brought closer to each other.

As previously described, the 3D light projection device 11 and the 2D light projection device 13 are configured/arranged such that the 3D illumination light and the 2D illumination light are projected at substantially the same angle at each position on the object surface. For this reason, the 3D light projection device 11 and the 2D light projection device 13 are arranged such that the central axes A and B of the projected light match each other, or even in the case of not matching, such that the central axes A and B are substantially parallel and close to each other. Specific examples of the configurations of the 3D light projection device 11 and the 2D light projection device 13 will be described later with reference to FIGS. 4 to 7.

The image capturing device 15 captures images of the object under control of an image capturing control unit 117 that is included in the drive control unit 111 of the control unit 110. More specifically, image capturing is performed at least two times, namely when the 3D illumination light is projected by the 3D light projection device 11 and when the 2D illumination light is projected by the 2D light projection device 13, thus respectively generating a 3D image and a 2D image. At this time, the exposure time when capturing the 3D image may be set longer than the exposure time when capturing the 2D image. Accordingly, the luminance values of the 3D image and the 2D image can be brought closer to each other.

Also, in the case of also eliminating the influence of ambient light, the image capturing device 15 also performs image capturing at a timing when light is not projected by the 3D light projection device 11 and the 2D light projection device 13, and only ambient light is being projected on the object, thus generating an ambient light image. Note that in the case of not giving consideration to the influence of ambient light, there is no need to generate an ambient light image.

2.2 Control Unit 110

The control unit 110 includes the drive control unit 111, an image input unit 119, a 3D image recording unit 121, a 2D image recording unit 123, an ambient light image recording unit 125, a division image generation unit 127, a light pattern image reading unit 129, a three-dimensional position calculation unit 131, and a three-dimensional point group output unit 133. Note that the division image generation unit 127 is one example of a "generation unit" of an embodiment, and the three-dimensional position calculation unit 131 is one example of a "calculation unit" of an embodiment.

The drive control unit 111 includes the 3D light projection control unit 113 for controlling driving of the 3D light projection device 11, the 2D light projection control unit 115 for controlling driving of the 2D light projection device 13, and the image capturing control unit 117 for controlling driving of the image capturing device 15. Here, the 3D light projection control unit 113, the 2D light projection control unit 115, and the image capturing control unit 117 are respectively examples of a "first light projection control unit", a "second light projection control unit", and an "image capturing control unit" of an embodiment.

The 3D light projection control unit 113 controls driving of the 3D light projection device 11 as described above, thus switching between projection/non-projection of 3D illumination light by the 3D light projection device 11. Similarly the 2D light projection control unit 115 controls driving of the 2D light projection device 13, thus switching between projection/non-projection of 2D illumination light by the 2D light projection device 13.

The image capturing control unit 117 controls driving of the image capturing device 15, thus causing image capturing to be performed by the image capturing device 15 at a desired timing. Specifically, the image capturing control unit 117 controls the image capturing device 15 so as to capture a 3D image when the 3D light projection control unit 113 performs control for 3D illumination light projection and capture a 2D image when the 2D light projection control unit 115 performs control for 2D illumination light projection. Also, in the case of giving consideration to the influence of ambient light, the image capturing control unit 117 controls the image capturing device 15 so as to capture an ambient light image at a timing when the 3D light projection control unit 113 and the 2D light projection control unit 115 perform control for non-projection of 3D illumination light and 2D illumination light.

The image input unit 119 receives input of images captured by the image capturing device 15. Specifically, the input of a 3D image and a 2D image are received from the image capturing device 15. The input images are recorded to a storage medium (not shown) by the 3D image recording unit 121 and the 2D image recording unit 123. In the case of giving consideration to the influence of ambient light, the image input unit 119 receives input of an ambient light image captured by the image capturing device 15. The input ambient light image is recorded to the storage medium (not shown) by the ambient light image recording unit 125. Note that in the case of not giving consideration to the influence of ambient light, an ambient light image is not needed, and therefore the control unit 110 is not required to have a configuration corresponding to the ambient light image recording unit 125. Also, the 3D image recording unit 121 and the 2D image recording unit 123 are respectively examples of a "first captured image recording unit" and a "second captured image recording unit" of an embodiment.

The division image generation unit 127 generates a division image with use of a 3D image and a 2D image that were recorded by the 3D image recording unit 121 and the 2D image recording unit 123. In the case of not giving consideration to the influence of ambient light, the division image is obtained by dividing the luminance values of the pixels of the 3D image by the luminance values of the pixels of the 2D image. Note that at this time, instead of simply dividing the 3D image by the 2D image, the division image generation unit 127 may multiply the luminance values of the 3D image by a predetermined coefficient, multiply the luminance values of the 2D image by a predetermined coefficient, and then divide the result of the former by the result of the latter.

In the case of giving consideration to the influence of ambient light, the division image is obtained by subtracting the luminance values of the pixels of the ambient light image from the luminance values of the pixels of the 3D image, subtracting the luminance values of the pixels of the ambient light image from the luminance values of the pixels of the 2D image, and then dividing the result of the former by the result of the latter. Note that at this time, instead of using the luminance values of the 3D image and the 2D image as they are, the division image generation unit 127 may use the results of performing a linear transformation (multiplication by a predetermined coefficient, and/or addition/subtraction of a predetermined value) on the luminance values of the 3D image and the 2D image.

The light pattern image reading unit 129 reads, from the storage medium (not shown), an image to be used in the projection of a light pattern by the 3D light projection device 11. The three-dimensional position calculation unit 131 calculates the three-dimensional positions of points on the object by obtaining the correspondence relationship between a pattern included in a division image generated by the division image generation unit 127 and a pattern included in the image read by the light pattern image reading unit 129. The three-dimensional point group output unit 133 outputs 3D point group information that includes information on the three-dimensional coordinates of points calculated by the three-dimensional position calculation unit 131.

2.3 Recognition Unit 150

The recognition unit 150 includes a CAD model reading unit 151, a CAD matching unit 153, and a matching result output unit 155.

The CAD model reading unit 151 reads CAD model information, which is three-dimensional information regarding an object and is stored in advance in the storage medium (not shown). The CAD matching unit 153 performs matching between the object CAD model information read by the CAD model reading unit 151 and object 3D point group information that was measured by the control unit 110 and output by the three-dimensional point group output unit 133. Accordingly, it is possible to specify the orientation, position, and the like of the object.

The matching result output unit 155 outputs the matching result obtained by the CAD matching unit 153, that is to say information regarding the orientation, position, and the like of the object, to a storage medium, an external device, or the like. For example, if the matching result output unit 155 outputs the matching result to a robot that has a robot arm, that robot can grasp the object.

3. Processing Flow

Figure 3:
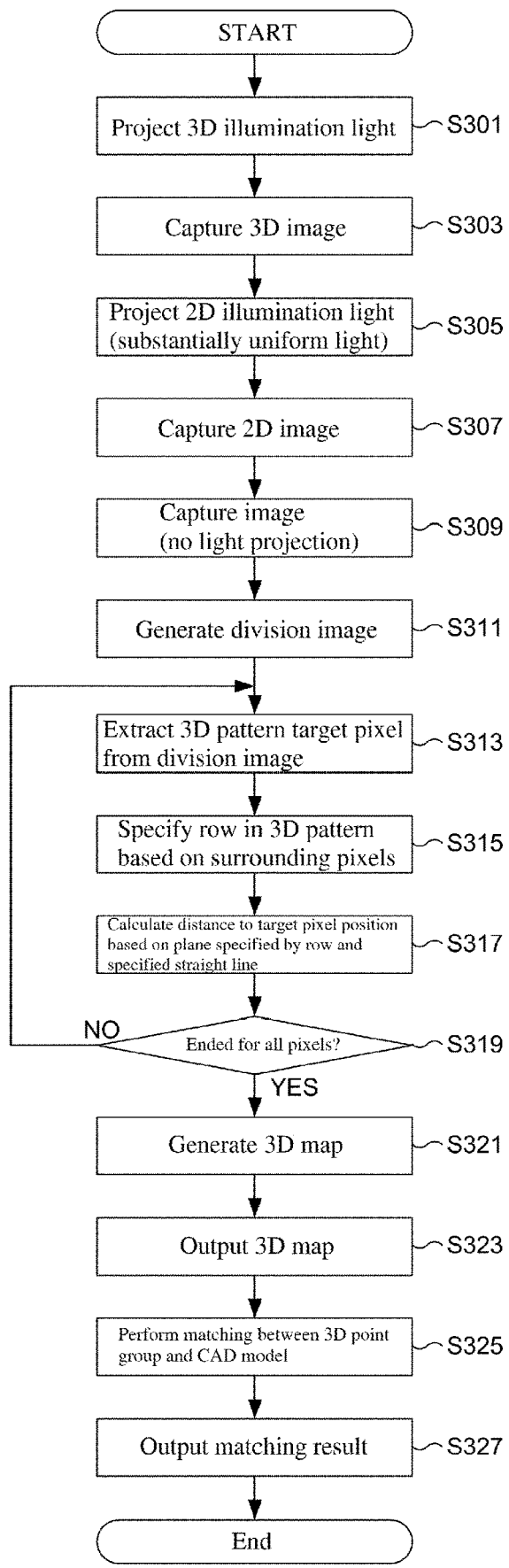
FIG. 3 is a flowchart illustrating an example of a processing procedure of an image processing system according to an embodiment.

The following describes a flow of processing performed by the image processing system 1 with reference to FIG. 3. FIG. 3 is a flowchart showing a flow of processing performed by the image processing system 1.

Note that the processing steps described below can be executed in any sequence or in parallel as long as no contradiction arises in the processing content, and also other steps may be added between these processing steps. Furthermore, steps described as being a single step for the sake of convenience can also be divided into multiple steps and executed in such a manner, and steps described as being separate steps for the sake of convenience can also be executed as a single step.

First, the 3D light projection control unit 113 of the drive control unit 111 causes the 3D light projection device 11 to project, onto a subject, 3D illumination light that has a pattern for specifying three-dimensional positions (step S301). The image capturing control unit 117 generates a 3D image by capturing an image of the object onto which the 3D illumination light is projected (step S303). The generated 3D image is recorded to the storage medium (not shown) by the 3D image recording unit 121.

Also, the 2D light projection control unit 115 of the drive control unit 111 causes the 2D light projection device 13 to project 2D illumination light (substantially uniform light) onto the subject (step S305). The image capturing control unit 117 generates a 2D image by capturing an image of the object onto which the 2D illumination light is projected (step S307).

Furthermore, in the case of giving consideration to the influence of ambient light, the image capturing control unit 117 of the drive control unit 111 generates an ambient light image by capturing an image of the subject in a state where the 3D light projection device 11 and the 2D light projection device 13 are not projecting light (step S309). In the case of not giving consideration to the influence of ambient light, the processing of step S309 is not necessary.

Note that the processing of steps S301 and S303, the processing of steps S305 and S307, and the processing of step S309 can be performed in any sequence. For example, it is possible to first perform the processing of step S309 for capturing an ambient light image, then perform the processing of steps S305 and S307 for capturing a 2D image, and lastly perform the processing of steps S301 and S303 for capturing a 3D image.

The division image generation unit 127 generates a division image with use of the 3D image, the 2D image, and the ambient light image that were generated. As previously described, in the case of giving consideration to the influence of ambient light, the division image is obtained by subtracting the luminance values of the pixels of the ambient light image from the luminance values of the pixels of the 3D image, subtracting the luminance values of the pixels of the ambient light image from the luminance values of the pixels of the 2D image, and then dividing the result of the former by the result of the latter. In the case of not giving consideration to the influence of ambient light, the division image can be generated by dividing the luminance values of the pixels of the 3D image by the luminance values of the pixels of the 2D image.

The three-dimensional position calculation unit 131 uses the thus-generated division image generated to generate 3D point group information (a three-dimensional map), which is information on the three-dimensional coordinates of points on the object (steps S313 to S321). There are various conceivable techniques for obtaining the three-dimensional coordinates of points on an object from an image of the object onto which a 3D pattern is projected (here, a division image generated from a 3D image of the object onto which a 3D pattern is projected). For example, in one conceivable technique, a processing target pixel related to the 3D pattern is extracted from the division image (step S313), a corresponding pixel and a corresponding row in an image having the 3D pattern used in pattern light projection are specified based on words surrounding the extracted processing target pixel (step S315), and the distance to a position on the object is calculated for the processing target pixel in the captured image with use of an intersection between a plane specified by the corresponding row and a straight line connecting the corresponding pixels in the image used in pattern light projection and in the division image (step S317). It is possible to repeat this processing (step S319: NO) until processing has been performed on all of the pixels in the captured image. Note that the term "word" refers to data in a certain region in an image having a 3D pattern for example, and a position in an image can be specified by the pattern that constitutes such a word.

In this way, when the three-dimensional coordinates of points on the object are obtained, the three-dimensional point group output unit 133 groups together the coordinates and outputs them as 3D point group information (a three-dimensional map) (steps S321 and S323).

The CAD matching unit 153 performs matching regarding the object three-dimensional map that was generated and the object CAD model that is stored in advance, and thereby specifies the position and orientation of the object in the captured image (step S325). The matching result output unit 155 outputs the matching result to a storage medium or an external device such as a robot that has a robot arm, for example (step S325). Upon receiving the matching result, the robot can specify a grasping position on the object or the like based on the matching result.

4. Example of Configuration of Light Projection Device

The following describes examples of configurations of the 3D light projection device 11 and the 2D light projection device 13 with reference to FIGS. 4 to 7.

4.1 First Configuration Example

First, a first configuration example of the 3D light projection device 11 and the 2D light projection device 13 will be described with reference to FIG. 4. In the first configuration example, the 3D light projection device 11 and the 2D light projection device 13 are integrally constituted as a single device, namely a light projection device 40.

The light projection device 40 includes a light source 401, a lens 403, a beam splitter (BS) 405, a mirror 407, a mask 409, a mirror 411, a mask 413, a polarization beam splitter (PBS) 415, an LCD (Liquid Crystal Display) 417, and a projection lens 419.

The light source 401 can be realized by an LED (Light Emitting Diode), an LD (Laser Diode), a VCSEL (Vertical Cavity Surface Emitting Laser), a lamp, or the like, and projects a monochromatic wavelength light beam.

The light beam emitted by the light source 401 is guided to the masks 409 and 413 by the lens 403. Along the guided light path, the light beam is split into an S polarized component and a P polarized component by the BS 405. The split light beam component that is reflected by the BS 405 (here, assumed to be the P polarized light) is reflected by the mirror 407, passes through the mask 409, which has a 3D photomask pattern for obtaining 3D illumination light, and is then incident on the PBS 415.

On the other hand, the split light beam component that passed through the BS 405 (here, assumed to be the S polarized light) is reflected by the mirror 411, passes through the mask 413 for obtaining 2D illumination light, which is substantially uniform light, and is then incident on the PBS 415. Here, the mask 413 can conceivably be an opening or a diffusing surface that homogenizes the light beam, for example. Alternatively, the mask 413 can conceivably be realized by a glass plate for obtaining the same optical path length for the light beam that is reflected by the BS 405 and the light beam that passes through the BS 405.

The PBS 415 performs multiplexing by allowing the passage of the light beam that passed through the mask 409 (here, P polarized light), and reflecting the light beam that passed through the mask 413 (here, S polarized light). The multiplexed light beam is then incident on the LCD 417. The LCD 417 switches between transmission/non-transmission of the P polarized light and the S polarized light in a time-division manner in accordance with an electrical signal. The projection lens 419 then projects the light that passed through the LCD 417, that is to say the P polarized light (here, 3D illumination light) or the S polarized light (here, 2D illumination light).

Figure 4:
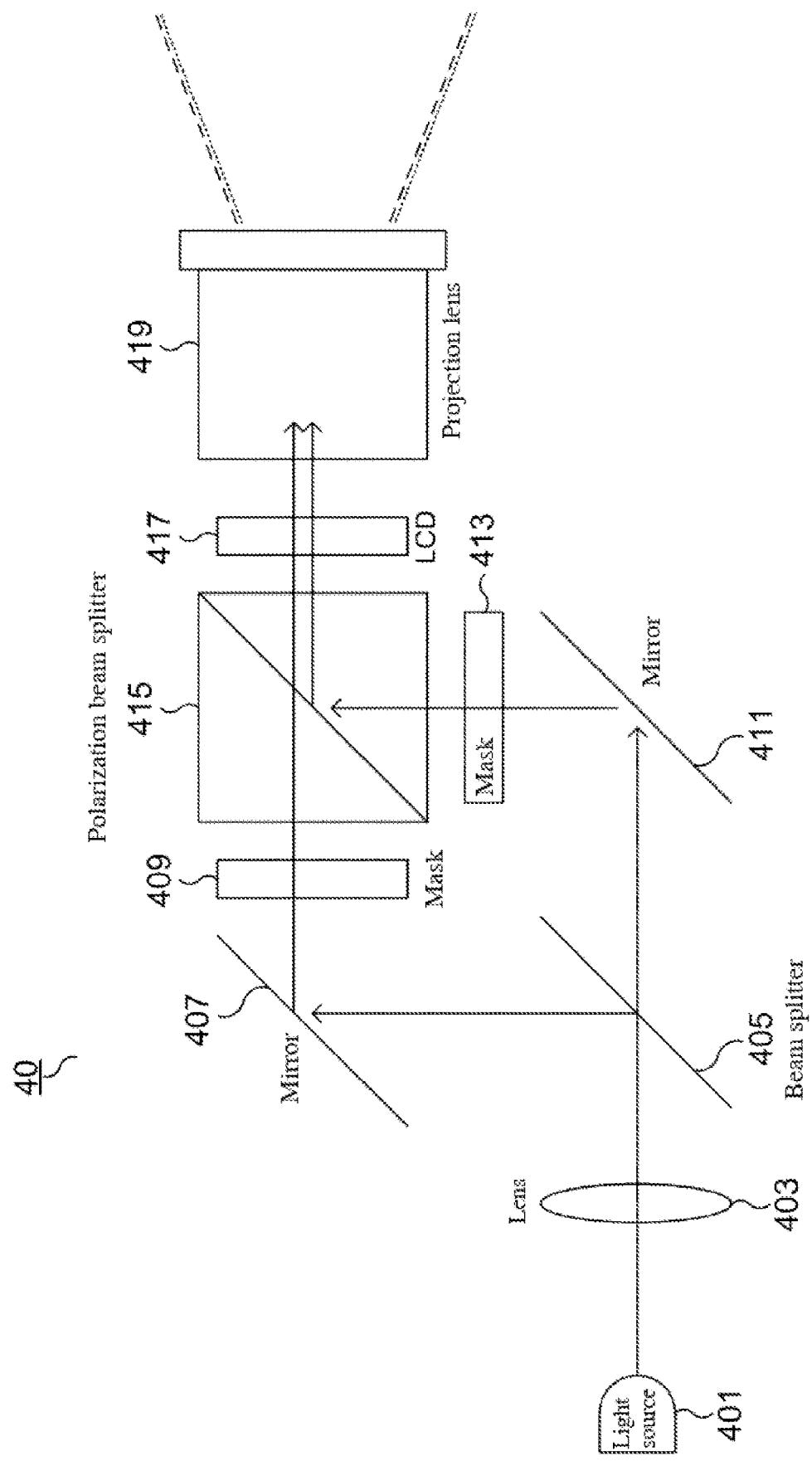
FIG. 4 is a diagram schematically illustrating an example of a configuration of a light projection device according to an embodiment.

The light projection device 40 shown in FIG. 4 projects the 3D illumination light and the 2D illumination light with use of the same light source, the same projection lens, and the like. Accordingly, it can be assumed that the 3D illumination light and the 2D illumination light have the same projection light central axis, angle of view, intensity distribution, wavelength characteristics, and the like. In other words, it is possible to accurately obtain the same reflection characteristics when the 3D illumination light and the 2D illumination light are projected onto the object. Accordingly, the influence of the reflection characteristics is also the same for the 3D image and the 2D image that are obtained by performing image capturing when the 3D illumination light and the 2D illumination light are respectively projected onto the object. As a result, when the image processing system 1 generates the division image, it is possible to minimize the influence of the coefficient component corresponding to the reflectance at the object surface in the division image.

4.2 Second Configuration Example

Next, a second configuration example of the 3D light projection device 11 and the 2D light projection device 13 will be described with reference to FIG. 5. Similarly to the first configuration example, in the second configuration example as well, the 3D light projection device 11 and the 2D light projection device 13 are integrally constituted as a single device, namely a light projection device 50. However, unlike the first configuration example, a light source 501 used for 3D illumination light and a light source 507 used for 2D illumination light are provided separately in the light projection device 50.

The light projection device 50 includes the light source 501, a lens 503, a mask 505, the light source 507, a lens 509, a mask 511, a PBS 513, an LCD 515, and a projection lens 517.

The light source 501 and the light source 507 can be realized by an LD, a VCSEL, or the like, and it is desirable that the polarized components are uniform. Here, it is assumed that the light source 501 emits P polarized light, and that the light source 507 emits S polarized light. The light source 501 and the light source 507 may have different wavelength characteristics. Note that in order to obtain the same intensity for the 3D illumination light and the 2D illumination light that are projected onto the object, the intensity of the light source 501 used for the 3D illumination light may be set higher than the intensity of the light source 507 used for the 2D illumination light.

The light beam emitted by the light source 501 is guided to the mask 505 by the lens 503. Similarly, the light beam emitted by the light source 507 is guided to the mask 511 by the lens 509. The mask 505, the mask 511, the PBS 513, the LCD 515, and the projection lens 517 can be considered to be respectively similar to the mask 409, the mask 413, the PBS 415, the LCD 417, and the projection lens 419 of the first configuration example.

Figure 5:
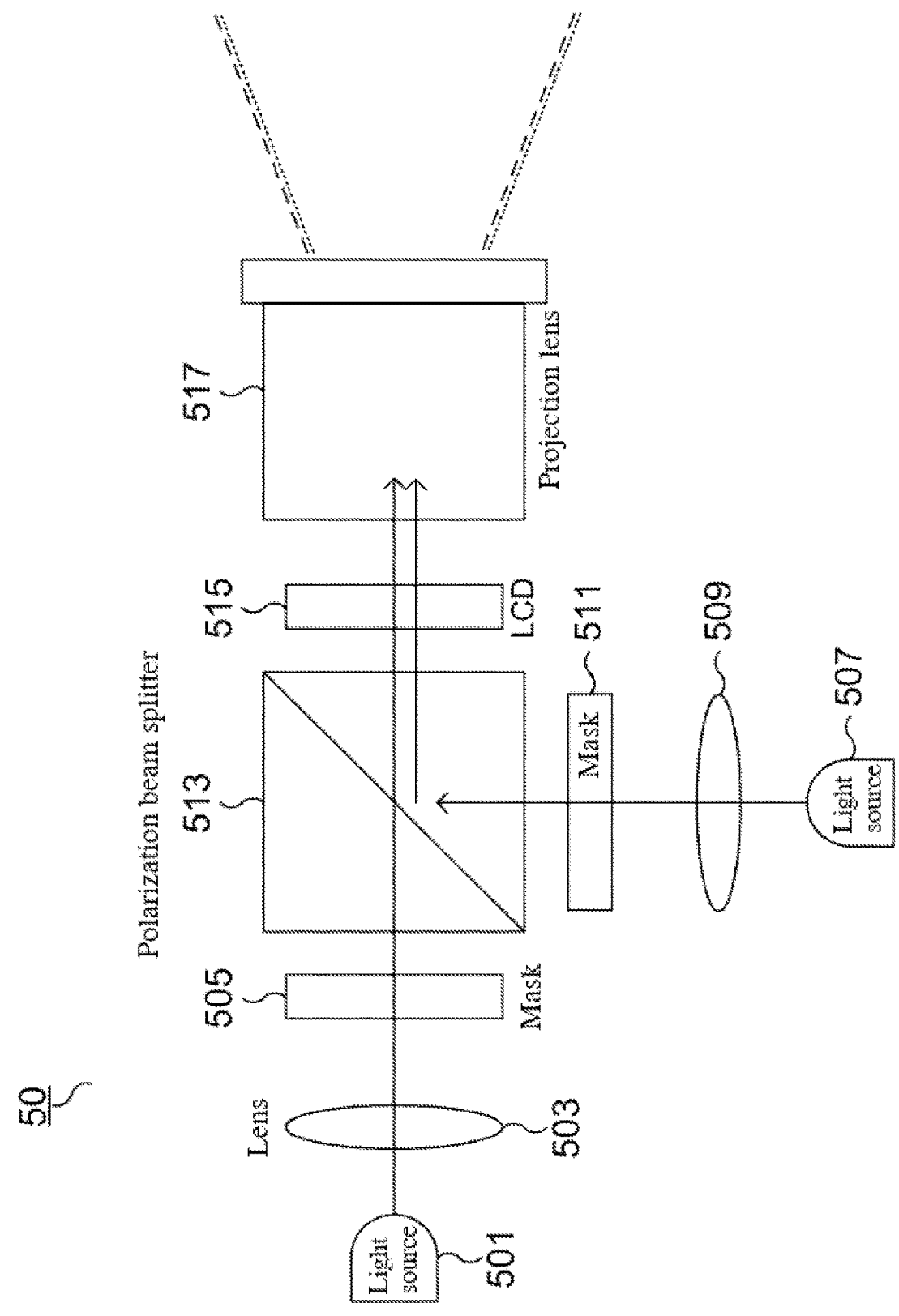
FIG. 5 is a diagram schematically illustrating another example of a configuration of a light projection device according to an embodiment.

The light projection device 50 shown in FIG. 5 projects the 3D illumination light and the 2D illumination light with use of the same projection lens. Accordingly, it can be assumed that the 3D illumination light and the 2D illumination light have the same projection light central axis, angle of view, intensity distribution, and the like. Accordingly, it is possible to obtain substantially the same reflection characteristics when the 3D illumination light and the 2D illumination light are projected onto the object. As a result, when a division image is generated by dividing components of the 3D image by components of the 2D image, it is possible to minimize the influence of the coefficient component corresponding to the reflectance at the object surface (corresponding to a described above) in the division image.

Also, in the second configuration example, there is no need for a beam splitter or a mirror, thus making it possible in some cases to achieve a smaller size and lower cost than in the first configuration example.

4.3 Third Configuration Example

Figure 6:
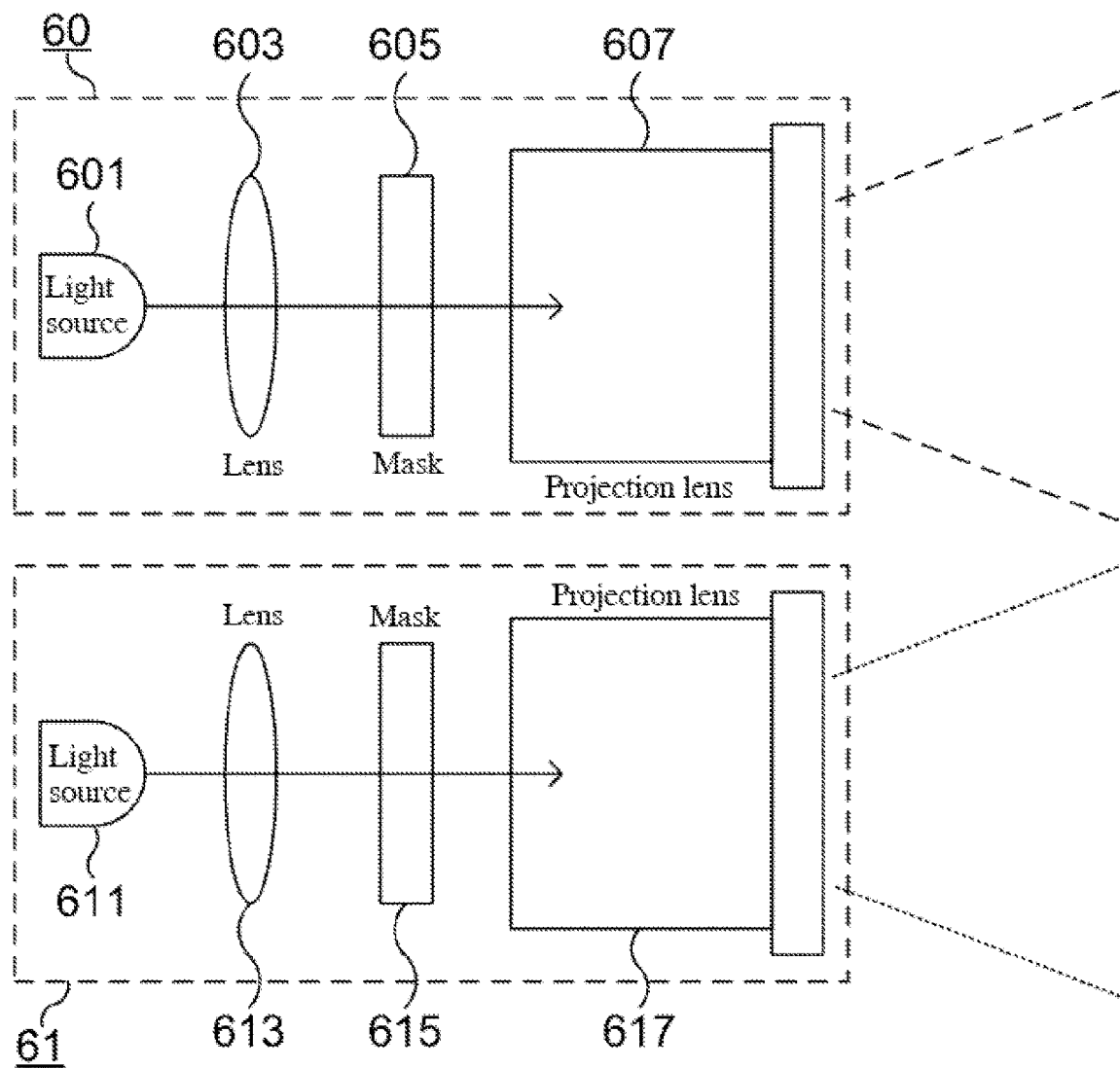
FIG. 6 is a diagram schematically illustrating another example of a configuration of a light projection device according to an embodiment.

Next, a third configuration example of the 3D light projection device 11 and the 2D light projection device 13 will be described with reference to FIG. 6. In the third configuration example, a light projection device 60 corresponds to the 3D light projection device 11, and a light projection device 61 corresponds to the 2D light projection device 13.

The light projection device 60 includes a light source 601, a lens 603, a mask 605, and a projection lens 607. Also, the light projection device 61 includes a light source 611, a lens 613, a mask 615, and a projection lens 617.

A light source that emits uniform polarized components, such as an LD or a VCSEL, is suited for use as the light source 601 and the light source 611, but they can also be realized by an LED, a lamp, or the like. The wavelengths of the light sources may be monochromatic wavelengths, but are not required to be monochromatic wavelengths. The light source 601 and the light source 611 may have different wavelength characteristics. Note that in order to obtain the same intensity for the 3D illumination light and the 2D illumination light that are projected onto the object, the intensity of the light source 601 used for the 3D illumination light may be set higher than the intensity of the light source 611 used for the 2D illumination light.

The light beam emitted by the light source 601 is guided to the mask 605 by the lens 603. The light beam emitted by the light source 611 is guided to the mask 615 by the lens 613.

The mask 605 and the mask 615 respectively correspond to the mask 409 and the mask 413 of the first configuration example. The light beams that pass through the mask 605 and the mask 615 are respectively projected by the projection lens 607 and the projection lens 617. Here, it is desirable that the projection lens 607 and the projection lens 617 have substantially the same characteristics, such as projection light angle of view, intensity distribution, and the like.

If it is assumed that the projection lenses 607 and 617 have the same angle of view and intensity distribution, that the projection lens 607 used for 3D illumination light and the projection lens 617 used for 2D illumination light are arranged near each other, and that the projection light central axes thereof are substantially parallel to each other, it can be assumed that the 3D illumination light and the 2D illumination light have substantially the same axis. Accordingly, the influence of the reflection characteristics is also the same for the 3D image and the 2D image that are obtained by performing image capturing when the 3D illumination light and the 2D illumination light are respectively projected onto the object. As a result, when a division image is generated by dividing components of the 3D image by components of the 2D image, it is possible to suppress to a low level the influence of the coefficient component corresponding to the reflectance at the object surface in the division image.

Also, in the third configuration example, there is no need for a beam splitter, a PBS, a mirror, or an LCD, thus making it possible in some cases to achieve a smaller size and lower cost than in the first configuration example.

4.4 Fourth Configuration Example

Figure 7:
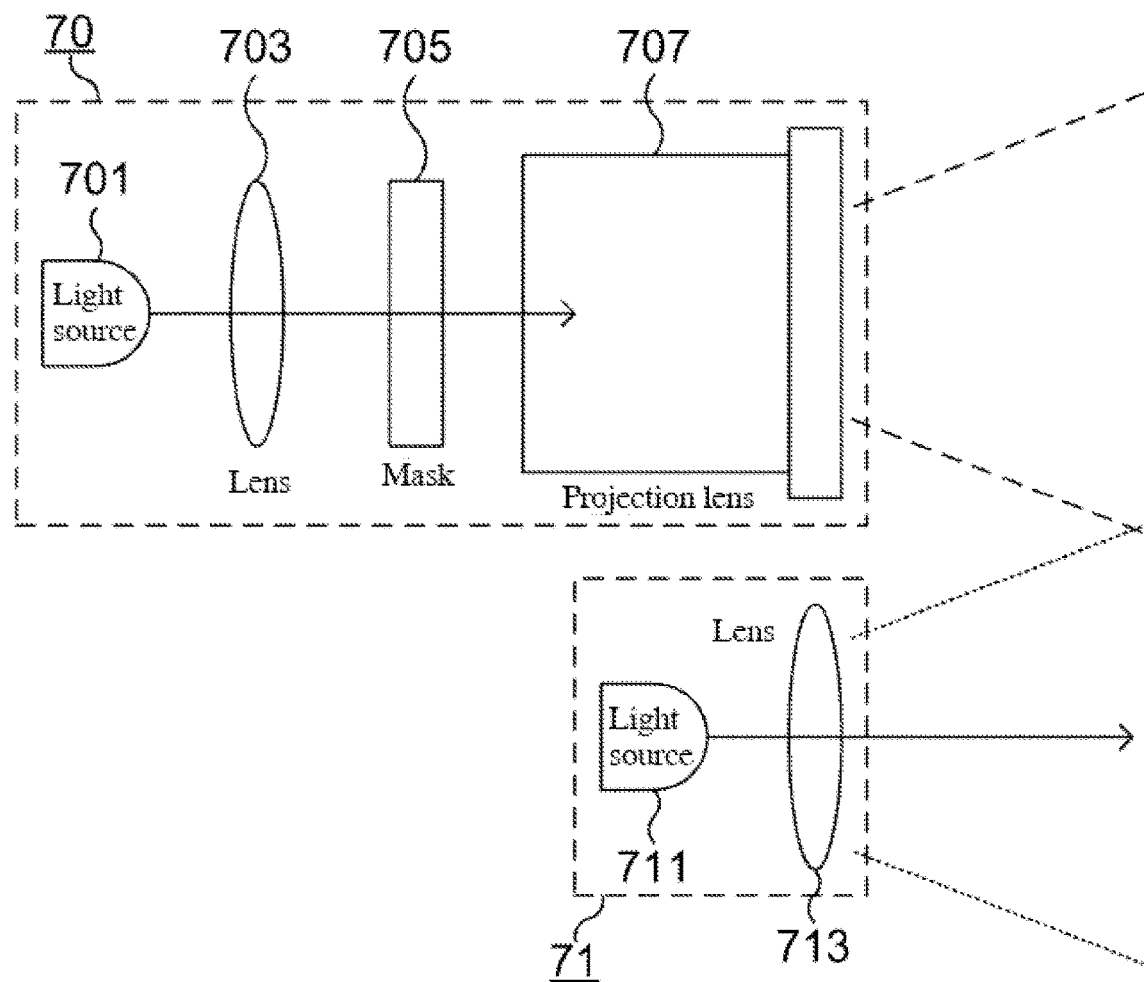
FIG. 7 is a diagram schematically illustrating another example of a configuration of a light projection device according to an embodiment.

Next, a fourth configuration example of the 3D light projection device 11 and the 2D light projection device 13 will be described with reference to FIG. 7. In the fourth configuration example, a light projection device 70 corresponds to the 3D light projection device 11, and a light source module 71 corresponds to the 2D light projection device 13.

Similarly to the light projection device 60 shown in the third configuration example, the light projection device 70 includes a light source 701, a lens 703, a mask 705, and a projection lens 707.

The light source module 71 includes a light source 711 and a lens 713. The light source 711 can be realized by an LED, an LD, a VCSEL, or a lamp. The wavelength may be a monochromatic wavelength, but is not required to be a monochromatic wavelength. The light source 701 and the light source 711 may have different wavelength characteristics. Note that in order to obtain the same intensity for the 3D illumination light and the 2D illumination light that are projected onto the object, the intensity of the light source 701 used for the 3D illumination light may be set higher than the intensity of the light source 711 used for the 2D illumination light.

The light beam emitted by the light source 701 is projected as a 2D light source (substantially uniform light) by the lens 713. At this time, it is desirable that the angle of view of the 2D illumination light projected by the lens 713 is substantially the same as the angle of view of the light projected by the projection lens 707.

If it is assumed that the projection lens 707 and the lens 713 have the same angle of view and intensity distribution, that the projection lens 707 used for 3D illumination light and the light source module 71 used for 2D illumination light are arranged near each other, and that the projection light central axes thereof are substantially parallel to each other, it can be assumed that the 3D illumination light and the 2D illumination light have substantially the same axis. Accordingly, the influence of the reflection characteristics is also the same for the 3D image and the 2D image that are obtained by performing image capturing when the 3D illumination light and the 2D illumination light are respectively projected onto the object. As a result, when a division image is generated by dividing components of the 3D image by components of the 2D image, it is possible to suppress to a low level the influence of the coefficient component corresponding to the reflectance at the object surface in the division image.

Also, in the fourth configuration example, the light source module 71 can be realized with a simple configuration, such as being an easy chip LED. As a result, it can be realized with a lower cost than in the first to third configuration examples.

5. Hardware Configuration

Figure 8:
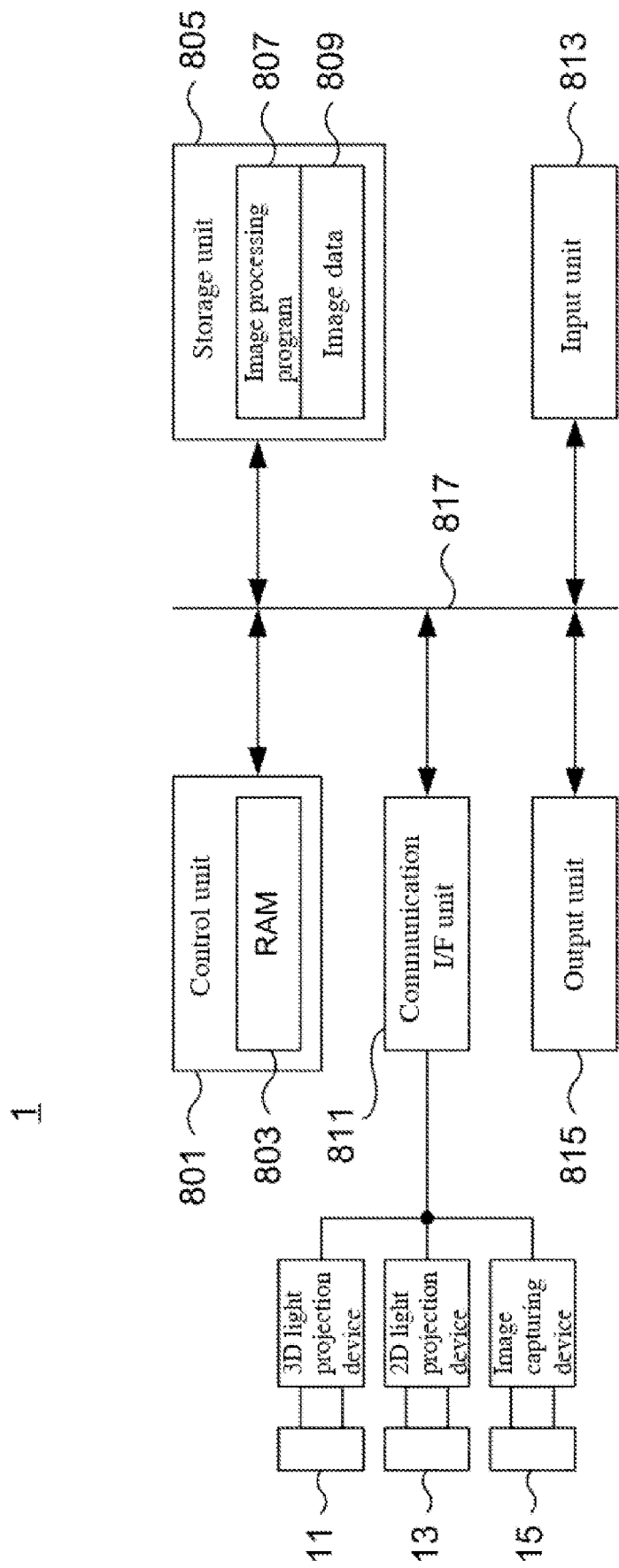
FIG. 8 is a diagram schematically illustrating an example of a hardware configuration of an image processing system according to an embodiment.

The following describes a hardware configuration capable of realizing the image processing system 1 with reference to FIG. 8. FIG. 8 schematically shows an example of a hardware configuration of the image processing system 1 of an embodiment.

The image processing system 1 shown in the example in FIG. 8 includes a control unit 801, a storage unit 805, a communication interface (I/F) unit 811, an input unit 813, and an output unit 815, and these units can communicate with each other via a bus line 817.

The control unit 801 includes a CPU (Central Processing Unit), a RAM (Random Access Memory) 803, a ROM (Read Only Memory), and the like, and controls the constituent elements in accordance with information processing. The storage unit 805 is an auxiliary storage device such as a hard disk drive (HDD) or a solid state drive (SSD), and stores, for example, an image processing program 807 executed by the control unit 801, and image data 809 such as an image for use in pattern light projection, and captured 3D images, 2D images, and ambient light images. CAD model data and the like are also stored in the storage unit 805.

The image processing program 807 is a program for causing execution of processing of the image processing system 1, which has been described with reference to FIGS. 1 to 3. In particular, the configurations of the control unit 110 and the recognition unit 150 shown in FIG. 2 can be realized as the image processing program 807.

The communication interface (I/F) unit 811 is a communication module for performing communication with another device wireless or via a wire, for example. The communication I/F unit 811 may use any communication technique for communication with another device, and examples include a LAN (Local Area Network) and a USB (Universal Serial Bus). In particular, the 3D light projection device 11, the 2D light projection device 13, and the image capturing device 15 can be provided so as to be capable of communicating with the control unit 801 or the like via the communication I/F unit 811.

The input unit 813 is a device for accepting various types of input operations from a user, and can be realized by a mouse, a keyboard, a touch panel, or the like. The output unit 815 is a device such as a display or a speaker, and is for presenting various types of information to the user of the image processing system 1 or the like with use of a display, audio, or the like.

6. Effects of an Embodiment

As described above, with the image processing system 1 of an embodiment, a 3D image is obtained by performing image capturing while a light pattern for three-dimensional measurement is projected onto an object, and also a 2D image is captured while projecting 2D illumination light that is substantially uniform light. By dividing components of the 3D image by components of the 2D image, it is possible to eliminate the influence of a coefficient component that corresponds to reflectance, which is an issue in three-dimensional measurement, such as protrusions and recessions in the shape of the object surface and reflection/penetration of light. Accordingly, it is possible to favorably measure the three-dimensional shape of even an object that has a complex surface shape.

7. Supplementary Notes

An embodiment described above is for facilitating understanding of the present invention, and is not intended to limit the interpretation of the present invention. The constituent elements provided in an embodiment, as well as the arrangements, materials, conditions, shapes, sizes, etc. thereof are not limited to the examples given above, and can be changed as desired. Also, portions of configurations shown in different embodiments can be replaced with each other combined.

Note 1

An image processing system comprising:

a first light projection unit (11) configured to project, onto an object, a light pattern for specifying a three-dimensional shape;

a second light projection unit (13) configured to project, onto the object, substantially uniform light in which illumination energy is substantially uniform in a cross-sectional direction relative to a light projection direction, the second light projection unit (13) projecting the substantially uniform light at substantially the same angle as in projection performed by the first light projection unit (11);

a first light projection control unit (113) configured to control projection of the light pattern onto the object by the first light projection unit (11);

a second light projection control unit (115) configured to control projection of the substantially uniform light onto the object by the second light projection unit (13);

an image capturing unit (15) configured to capture an image of the object;

an image capturing control unit (117) configured to control image capturing performed by the image capturing unit (15);

a first captured image recording unit (121) configured to record a first captured image that is captured by the image capturing unit (15) in a state where the first light projection control unit (113) performs control such that the light pattern is projected and the second light projection control unit (115) performs control such that the substantially uniform light is not projected;

a second captured image recording unit (123) configured to record a second captured image that is captured by the image capturing unit (15) in a state where the first light projection control unit (113) performs control such that the light pattern is not projected and the second light projection control unit (115) performs control such that the substantially uniform light is projected;

a generation unit configured to generate a division image by dividing components of the first captured image by components of the second captured image; and a calculation unit configured to calculate a three-dimensional position on the object with use of the division image.

Note 2

The image processing system (1) according to Note 1, wherein the generation unit (127) is configured to generate the division image by obtaining a first image by subtracting components of a third captured image from components of the first captured image, the third captured image being captured in a state where ambient light is projected onto the object and the first light projection unit and the second light projection unit are not performing projection, obtaining a second image by subtracting components of the third captured image from components of the second captured image, and then dividing the first image by the second image.

Note 3

The image processing system (1) according to Note 1 or 2, wherein a projection time of the second light projection unit (13) when capturing the second captured image is shorter than a projection time of the first light projection unit (11) when capturing the first captured image.

Note 4

The image processing system (1) according to Note 1 or 2, wherein an exposure time of the image capturing unit (15) when capturing the second captured image is shorter than an exposure time of the image capturing unit (159) when capturing the first captured image.

Note 5

The image processing system (1) according to any one of Notes 1 to 4, wherein the first light projection unit (11) and the second light projection unit (13) are configured to perform projection with use of the same projection lens (419, 517).

Note 6

The image processing system (1) according to Note 5, wherein the first light projection unit (11) and the second light projection unit (13) are configured to perform projection with use of the same light source (401).

Note 7

The image processing system (1) according to any one of Notes 1 to 4, wherein the first light projection unit (11) is configured to perform projection with use of a first light source (501, 601, 701), and the second light projection unit (13) is configured to project the substantially uniform light onto the object at substantially the same angle as the first light projection unit (11) with use of a second light source (507, 611, 711) provided separately from the first light source (501, 601, 701).

Note 8

The image processing system (1) according to any one of Notes 1 to 4, wherein the first light projection unit (11) is configured to perform projection with use of a first light source (601) and a first projection lens (607), and the second light projection unit (13) is configured to project the substantially uniform light onto the object at substantially the same angle as in projection performed by the first light projection unit (11), with use of a second light source (611) and a second projection lens (617) that are provided separately from the first light source (601) and the first projection lens (607).

Note 9

The image processing system (1) according to Note 7 or 8, wherein an intensity of the first light source is higher than an intensity of the second light source.

Note 10

The image processing system (1) according to any one of Notes 1 to 9, further comprising:

a reading unit (151) that is configured to read three-dimensional structure data regarding the object; and a matching unit (153) that is configured to perform matching between the three-dimensional structure data regarding the object and the three-dimensional position.

Note 11

An image processing method in which an image processing system (1) performs:

a first light projection step of controlling a first light projection unit (11) configured to project, onto an object, a light pattern for specifying a three-dimensional shape;

a second light projection step of controlling a second light projection unit (13) configured to project, onto the object, substantially uniform light in which illumination energy is substantially uniform in a cross-sectional direction relative to a light projection direction, the second light projection unit (13) projecting the substantially uniform light at substantially the same angle as in projection performed in the first light projection step;

an image capturing step of controlling an image capturing unit (15) configured to capture an image of the object;

a first captured image recording step of recording a first captured image that is captured by the image capturing unit in a state where control is performed in the first light projection control step such that the light pattern is projected and control is performed in the second light projection control step such that the substantially uniform light is not projected;

a second captured image recording step of recording a second captured image that is captured by the image capturing unit in a state where control is performed in the first light projection control step such that the light pattern is not projected and control is performed in the second light projection control step such that the substantially uniform light is projected;

a generating step of generating a division image by dividing components of the first captured image by components of the second captured image; and a calculating step of calculating a three-dimensional position on the object with use of the division image.

The invention claimed is:

1. An image processing system comprising:
a first light projector configured to project, onto an object, a light pattern for specifying a three-dimensional shape;
a second light projector configured to project, onto the object, uniform light in which illumination energy is uniform in a cross-sectional direction relative to a light projection direction, the second light projector projecting the uniform light at the same angle as in projection performed by the first light projector;
a camera for capturing an image of the object; and
a processor configured with a program to perform operations comprising:
operation as a first light projection control unit configured to control projection of the light pattern onto the object by the first light projector;
operation as a second light projection control unit configured to control projection of the uniform light onto the object by the second light projector;
operation as an image capturing control unit configured to control image capturing performed by the camera;
operation as a first captured image recording unit configured to record a first captured image comprising 3D image components, that is captured by the camera in a state where the first light projection control unit performs control such that the light pattern is projected and the second light projection control unit performs control such that the uniform light is not projected;
operation as a second captured image recording unit configured to record a second captured image comprising 2D image components, that is captured by the camera in a state where the first light projection control unit performs control such that the light pattern is not projected and the second light projection control unit performs control such that the uniform light is projected;
operation as an ambient light image recording unit configured to record a third captured image that is captured by the camera in a state where the first light projection control unit performs control such that the light pattern is not projected and the second light projection control unit performs control such that the uniform light is not projected;
operation as a generation unit configured to generate a division image by:
performing a first subtraction comprising subtracting the third captured image from the first captured image to produce the 3D image components;
performing a second subtraction comprising subtracting the third captured image from the second captured image to produce the 2D image components; and
dividing the 3D image components resulting from the first subtraction by the 2D image components resulting from the second subtraction to produce a division image; and operation as a calculation unit configured to calculate a three-dimensional position on the object using the division image.

2. The image processing system according to claim 1, wherein the processor is configured with the program to perform operations such that operation as the generation unit comprises generating the division image by: performing the first subtraction, which further comprises subtracting luminance components of the third captured image from luminance components of the first captured image, the third captured image being captured in a state where ambient light is projected onto the object and the first light projector and the second light projector are not performing projection, performing the second subtraction, which further comprises subtracting the luminance components of the third captured image from luminance components of the second captured image, and dividing the result of the first subtraction by the result of the second subtraction.

3. The image processing system according to claim 1, wherein a projection time of the second light projector when capturing the second captured image is shorter than a projection time of the first light projector when capturing the first captured image.

4. The image processing system according to claim 1, wherein an exposure time of the camera when capturing the second captured image is shorter than an exposure time of the camera when capturing the first captured image.

5. The image processing system according to claim 1, wherein the first light projector and the second light projector are configured to perform projection using the same projection lens.

6. The image processing system according to claim 5, wherein the first light projector and the second light projector are configured to perform projection using the same light source.

7. The image processing system according to claim 1, wherein the first light projector is configured to perform projection using a first light source, and
the second light projector is configured to project the uniform light onto the object at the same angle as the first light projector using a second light source separate from the first light source.

8. The image processing system according to claim 1, wherein the first light projector is configured to perform projection using a first light source and a first projection lens, and
the second light projector is configured to project the uniform light onto the object at the same angle as in projection performed by the first light projector, using a second light source and a second projection lens that are provided separately from the first light source and the first projection lens.

9. The image processing system according to claim 7, wherein an intensity of the first light source is higher than an intensity of the second light source.

10. The image processing system according to claim 1, wherein the processor is further configured with the program to perform operations comprising:
operation as a reading unit configured to read three-dimensional structure data regarding the object; and
operation as a matching unit configured to perform matching between the three-dimensional structure data regarding the object and the three-dimensional position.

11. The image processing system according to claim 2, wherein a projection time of the second light projector when capturing the second captured image is shorter than a projection time of the first light projector when capturing the first captured image.

12. The image processing system according to claim 2, wherein an exposure time of the camera when capturing the second captured image is shorter than an exposure time of the camera when capturing the first captured image.

13. The image processing system according to claim 2, wherein the first light projector and the second light projector are configured to perform projection using the same projection lens.

14. The image processing system according to claim 13, wherein the first light projector and the second light projector are configured to perform projection using the same light source.

15. The image processing system according to claim 2, wherein the first light projector is configured to perform projection using a first light source, and
the second light projector is configured to project the uniform light onto the object at the same angle as the first light projector using a second light source provided separately from the first light source.

16. The image processing system according to claim 2, wherein the first light projector is configured to perform projection using a first light source and a first projection lens, and
the second light projector is configured to project the uniform light onto the object at the same angle as in projection performed by the first light projector, using a second light source and a second projection lens that are provided separately from the first light source and the first projection lens.

17. The image processing system according to claim 8, wherein an intensity of the first light source is higher than an intensity of the second light source.

18. The image processing system according to claim 2, wherein the processor is further configured with the program to perform operations comprising:
operation as a reading unit configured to read three-dimensional structure data regarding the object; and
operation as a matching unit configured to perform matching between the three-dimensional structure data regarding the object and the three-dimensional position.

19. An image processing method for performing image processing with an image processing system, the method comprising:
controlling a first light projector configured to project, onto an object, a light pattern for specifying a three-dimensional shape;
controlling a second light projector configured to project, onto the object, uniform light in which illumination energy is uniform in a cross-sectional direction relative to a light projection direction, the second light projector projecting the uniform light at the same angle as in projection performed by the first light projector;
controlling a camera for capturing an image of the object;
recording a first captured image comprising 3D image components, that is captured by the camera in a state where:
control is performed such that the light pattern is projected by the first light projector;
and control is performed such that the uniform light is not projected by the second light projector;
recording a second captured image comprising 2D image components, that is captured by the camera in a state where: control is performed such that the light pattern is not projected by the first light projector; and control is performed such that the uniform light is projected by the second light projector;
recording a third captured image that is captured by the camera in a state where:
control is performed such that the light pattern is not projected by the first light projector;
and control is performed such that the uniform light is not projected by the second light projector;
generating a division image by:
performing a first subtraction comprising subtracting the third captured image from the first captured image to produce the 3D image components;
performing a second subtraction comprising subtracting the third captured image from the second captured image to produce the 2D image components; and
dividing the 3D image components resulting from the first subtraction by the 2D image components resulting from the second subtraction to produce a division image; and
calculating a three-dimensional position on the object using the division image.

* * * * *